United States Patent
Näslund et al.

(10) Patent No.: US 7,722,281 B2
(45) Date of Patent: *May 25, 2010

(54) DEVICE FOR AND METHOD OF FASTENING AN EMITTER

(75) Inventors: Lars Åke Näslund, Furulund (SE); Tommy Nilsson, Svedala (SE); Luca Poppi, Formigine (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/172,608

(22) Filed: Jul. 14, 2008

(65) Prior Publication Data
US 2008/0273919 A1 Nov. 6, 2008

Related U.S. Application Data

(62) Division of application No. 10/561,233, filed as application No. PCT/SE2004/000893 on Jun. 9, 2004, now Pat. No. 7,413,368.

(30) Foreign Application Priority Data
Jun. 19, 2003 (SE) .................................... 0301783

(51) Int. Cl.
*B25B 27/00* (2006.01)
(52) U.S. Cl. .................. 403/321; 403/116; 29/281.1
(58) Field of Classification Search .............. 403/321, 403/322.1, 325, 326, 112, 116; 269/134–138, 269/143, 233, 249; 29/257, 281.1; 250/492.3, 250/427, 423 F; 315/111.81
See application file for complete search history.

(56) References Cited

U.S. PATENT DOCUMENTS

| | | | |
|---|---|---|---|
| 3,492,702 A | 2/1970 | Stafford | |
| 3,896,729 A | 7/1975 | Moyer | |
| 4,195,414 A | 4/1980 | Robinson | |
| 4,461,972 A * | 7/1984 | Dmitriev et al. | 313/420 |
| 5,517,697 A | 5/1996 | Boehm | |
| 5,975,592 A | 11/1999 | Lin | |
| 6,036,398 A | 3/2000 | Theodorou | |
| 6,450,727 B2 | 9/2002 | Lu | |
| 6,644,467 B1 | 11/2003 | Chiuch | |
| 2003/0156508 A1 | 8/2003 | Ohyama et al. | |
| 2004/0051302 A1 | 3/2004 | Canale | |
| 2004/0246880 A1 | 12/2004 | Tamura | |
| 2006/0016163 A1 | 1/2006 | O'Connor et al. | |

FOREIGN PATENT DOCUMENTS

GB  1 200 358  7/1970

* cited by examiner

*Primary Examiner*—Michael P Ferguson
*Assistant Examiner*—Joshua T Kennedy
(74) *Attorney, Agent, or Firm*—Buchanan Ingersoll & Rooney PC (57) ABSTRACT

A device for fastening an emitter to a housing comprises a manoeuvre element slidable in a first direction, an activating element slidable in a second, fastening direction that is inclined in relation to the first direction, with the first and second elements are interconnected via at least one cam mechanism. In addition, a fastening element is slidable in the second direction, wherein the activating and fastening elements are interconnected via at least one elastic element. The fastening element is adapted to move, in response to displacement of the manoeuvre element in the first direction, between a fastening position in which it produces a fastening force onto the emitter and an open position in which the fastening force is released.

18 Claims, 5 Drawing Sheets

DEVICE FOR AND METHOD OF FASTENING AN EMITTER

This application is a divisional of U.S. application Ser. No. 10/561,233 having a filing date of Dec. 19, 2005, now U.S. Pat. No. 7,413,368, which is a U.S. national stage application of International Application No. PCT/SE2004/000893 having a filing date of Jun. 9, 2004, the entire content of which is incorporated herein by reference, and which claims priority under 35 U.S.C. §119(a) to Swedish Application No. 0301783-7 having a filing date of Jun. 19, 2003, the entire content of which is incorporated herein by reference.

FIELD OF INVENTION

The present invention relates to a device for fastening an emitter to a housing and a method of fastening an emitter to a housing.

TECHNICAL BACKGROUND

WO 00/34958 discloses a conventional substantially circular electron beam emitter. The emitter generally comprises a closed vacuum chamber with an exit window and an electron source inside the chamber. The electron source in this disclosure is a filament. By conducting a current through the filament, the filament is heated to about 2000° C. and emits a cloud of electrons. These electrons are then accelerated in vacuum from the filament to the exit window by a voltage difference between the filament and the exit window. The energy of the electrons as they leave the chamber through the exit window can e.g. be used to cure coatings on webs moving past the emitter and for sterilisation of surfaces.

However, there exist a number of different kinds of emitters using different kinds of technology to achieve the desired electron beam. See e.g. U.S. Pat. Nos. 5,962,995 and 5,637,953.

Furthermore, U.S. Pat. No. 5,194,742 discloses a method of and apparatus for shielding electron and other particle beam accelerators. The disclosed design relates to a tunnel-shaped shielding, through which the web is guided, and an emitter fastened to the wall of the shielding. The specific feature of this design is that a portion of the shielding is movable in a direction transverse to both the electron beam and the travel direction of the web, with the purpose of facilitating threading of the web through the tunnel.

SUMMARY

An object of the invention is to provide means for securely fastening an emitter to a housing. Issues to consider for secure fastening is amongst others: easy and safe to handle by a machine operator or service technician, controllable fastening force, low risk of damaging the emitter and housing, etc. The object of the invention has in accordance with the invention been achieved with a device as set forth by way of introduction, comprising a first, manoeuvre element being slidable in a first direction, a second, activating element being slidable in a second, fastening direction being inclined in relation to said first direction, whereby the first and second elements are interconnected via at least one cam mechanism such that displacement of the first element in said first direction causes displacement of the second element in said second direction. By using a cam mechanism like this, the fastening of the emitter can easily be manoeuvred from one or the other side being essentially transverse to the fastening direction. The use of the cam mechanism makes it also easy to design the fastening device such that the emitter can be inserted in a transverse direction. The insertion and manoeuvrability from the side makes the design easy and safe for the machine operator. Moreover, the cam mechanism makes it possible to in simple way provide the design with a gear ratio in respect of the transmission of the movement and the forces from the first element to the second element. The cam mechanism makes it easy to vary this ratio during different portions of the strokes of the elements. This ratio is a factor when considering the handleability of the fastening device, since it influences the force needed from the operator.

Preferred embodiments of the invention are defined in the dependent claims.

In accordance with a preferred embodiment the device further comprises a third, fastening element being slidable in the second direction, whereby the second and third elements are interconnected via at least one fourth, elastic element being elastic in said second direction, whereby the third element is adapted to move, in response to displacement of the first element in said first direction, between a fastening position in which it produces a fastening force onto said emitter and an open position in which the fastening force is released. By interconnecting the second and third elements with an elastic element, the force will rise in a controlled manner in relation to the displacement of the second element in respect of the third element. If using only direct contact between the elements, the dependency between the force and displacement would be determined by the deformation of the weakest element, i.e. the force would rise excessively already at low deformations. The elastic element can be biased, which will give an even lower dependency between the force and displacement.

By using the correct elastic element, the force applied to the emitter can be predetermined with a satisfactory certainty even if the displacement between the different elements is relatively poorly controlled, e.g. due to erroneous handling of the device. The combination of the cam mechanism and the interconnection via the elastic member makes the design especially suitable for the fastening of an emitter. The cam mechanism makes it possible to have a movement being fast in the beginning and slow at the very last step of the fastening purely by forming the cam in a desired manner. A slow movement, i.e. a small movement of the second element in relation to a certain movement of the first element, will make it easy to stop the second element in the desired position. Moreover, when utilising the elastic element within this portion of the movement, the fastening force onto the emitter can be almost independent of the final adjustment of the second element, which makes it very easy to achieve the correct fastening force. Thus, even a rather gross maladjustment of the first element will give a fastening force within tolerable limits.

The invention also concerns a device for fastening an emitter to a housing comprising a fastening element being slidable in a fastening direction and an activating element being slidable in the fastening direction, whereby the fastening and activating elements are interconnected via at least one elastic element being elastic in said fastening direction, whereby the fastening element is adapted to move, in response to displacement of the activating element, between a fastening position in which it produces a fastening force onto said emitter and an open position in which the fastening force is released. By interconnecting the fastening and activating elements with an elastic element, the force will rise in a controlled manner in relation to the displacement of the activating element in respect of the fastening element. If using only direct contact between the elements, the dependency between the force and displacement would be determined by the deformation of the weakest element, i.e. the force would rise excessively already at low deformations. The elastic element can be biased, which will give an even lower dependency between the force and displacement. By using the correct elastic element, the force applied to the emitter can be predetermined with a satisfactory certainty even if the displacement between the different elements is relatively poorly controlled, e.g. due to erroneous handling of the device.

Preferably, the device further comprises a manoeuvre element being slidable in a manoeuvre direction being inclined in relation to said fastening direction, whereby the manoeuvre element and the activating element are interconnected via at least one cam mechanism such that displacement of the manoeuvre element in said manoeuvre direction causes displacement of the activating element in said fastening direction. By using a cam mechanism like this, the fastening of the emitter can easily be manoeuvred from one or the other side both being essentially transverse to the fastening direction. The use of the cam mechanism makes it also easy to design the fastening device such that the emitter can be inserted in a transverse direction. The insertion and manoeuvrability from the side makes the design easy and safe for the machine operator. Moreover, the cam mechanism makes it possible to in simple way provide the design with a gear ratio in respect of the transmission of the movement and the forces from the first element to the second element. The cam mechanism makes it easy to vary this ratio during different portions of the strokes of the elements. This ratio is a factor when considering the handleability of the fastening device, since it influences the force needed from the operator. The combination of the cam mechanism and the interconnection via the elastic element makes the design especially suitable for the fastening of an emitter. The cam mechanism makes it possible to have a movement being fast in the beginning and slow at the very last step of the fastening purely by forming the cam in a desired manner. As mentioned above, a slow movement, i.e. a small movement of the activating element in relation to a certain movement of the manoeuvre element, will make it easy to stop the activating element in the desired position. Moreover, when utilising the elastic member within this portion of the movement, the fastening force onto the emitter can be almost independent of the final adjustment of the activating element, which makes it very easy to achieve the correct fastening force. Consequently, even a rather gross maladjustment of the manoeuvre element will give a fastening force within tolerable limits.

In accordance with a preferred embodiment of the invention the cam mechanism comprises a profiled, elongated recess in one of the first, manoeuvre element and the second, activating element forming a cam surface and a follower on the other of said first and second elements, the follower being adapted to run in said recess. By forming the cam mechanism as a recess and a follower, it is easy to achieve the reciprocal movement of the second element. One side of the recess will form a cam surface in one direction of movement and the other side will for the cam surface in the other direction of movement.

Preferably, the cam mechanism comprises a profiled, elongated recess forming a cam surface in said first, manoeuvre element and a follower on said second, activating element, the follower being adapted to run in said recess. When considering the directions in which the elements are slidable and in combination with which elements are acting on the emitter it is convenient to form the recess in the first element since this element can have an extension in the plane defined by the first and second direction of movement without any specific considerations due to lack of space. Moreover, as a consequence it is preferred that the second element, being subject to considerations due to lack of space, comprises the follower, since the follower can be formed simply as a pin or the like.

In accordance with a preferred embodiment the cam surface has an end portion being perpendicular to the direction in which the element provided with the follower is slidable. By forming the cam surface this way, the last portion of the movement of the first, manoeuvre element does not give any movement of the second, activating element at all. That is even a rather gross maladjustment of the final position of the first element will not give rise to any difference in position of the second element at all and consequently the fastening force will not be influenced during this portion of the movement.

In order to secure the correct dependence between the displacement of the second, activating element and the fastening force the elastic element has a minimal elastic length being shorter than the distance between the second, activating element and the third, fastening element when the device is in its fastening position. It should be noted that the relevant distance between the second and the third member referred to above is the distance where the elastic element is located, i.e. the distance experienced by the elastic member. Preferably, the device comprises at least two elastic elements between the second, activating element and the third, fastening element. By providing two or more elastic elements, the device can handle misalignment even better. If the emitter, the housing and/or the fastening device are aligned in respect of each other the elastic elements will accept the misalignment as differences in deformation of the different elastic members, but due to the controlled dependence between deformation and force, the fastening force will still be controlled for the different portions of the emitter.

Preferably, the first, manoeuvre element and the second, activating element are interconnected via at least two cam mechanisms. This configuration will minimise the risk of misalignment of the second element in relation to the first element, which in turn will help securing a pure translational movement and correct fastening of the emitter.

The above mentioned objective has also been achieved in accordance with the invention by means of a method of fastening an emitter to a housing comprising the steps of: providing an emitter by the place where it is to be fastened to the housing, providing a fastening element slidable in a fastening direction between a fastening position in which it produces a fastening force onto said emitter and an open position in which the fastening force is released, providing an activating element slidable along said fastening direction, providing an elastic element interconnecting said fastening element and said activating element, said elastic element being elastic along said fastening direction, sliding the activating element and thereby sliding the elastic element and the fastening element until the emitter abuts the housing, sliding the activating element and thereby compressing the elastic element such that it presses the fastening element against the emitter which in turn is pressed against the housing.

By providing an elastic element interconnecting the fastening and activating elements, the force will during the sliding of the activating element rise in a controlled manner in relation to the displacement of the activating element in respect of the fastening element. If using only direct contact between the elements, the dependency between the force and displacement would be determined by the deformation of the weakest element, i.e. the force would rise excessively already at low deformations. The elastic element can be biased, which will give an even lower dependency between the force and displacement. By using the correct elastic element, the force applied to the emitter can be predetermined with a satisfactory certainty even if the displacement between the different elements is relatively poorly controlled, e.g. due to erroneous handling of the device.

In accordance with a preferred embodiment the activating element is slid along said fastening direction until it reaches an end position corresponding to the fastening position of the fastening element, whereby the elastic element only being partially compressed. This secures the correct dependence between the movement of the activating element and the achieved fastening force, such that the forces do not excessively rise during the displacement of the activating element.

BRIEF DESCRIPTION OF THE DRAWINGS

The invention will be described in more detail with reference to the appended schematic drawings, which shows an example of a presently preferred embodiment of the invention.

DETAILED DESCRIPTION

The fastening device generally comprises a first element 10 sometimes named manoeuvre element, a second element 20 sometimes named activating element, a third element 30 sometimes named fastening element and a fourth element 40 sometimes named elastic element.

The fastening device is adapted for fastening an electron beam emitter 1 to a housing 2. The housing 2 disclosed in this embodiment is adapted to allow a web to pass between two opposing emitters 1 (only one shown). The housing is provided with a web inlet opening 2a and a web outlet opening 2b. It is also provided with two opposing openings 2c, 2d through which the electrons from the emitters 1 are allowed to enter the housing 2 in order to sterilise the web passing through the housing 2 between the emitters 1.

Below the description will focus on the fastening device adapted to fasten an emitter to one of the openings in the housing. Of course a similar fastening device is contemplated to be employed for fastening another emitter at the other opening in the housing. This fastening device can be a truly mirrored construction (mirrored in the centre plane of the housing) or a combination of a mirrored and identical but moved device. This kind of design changes is amongst others dependent upon manufacturing advantages in relation to functional requirements.

The emitter 1 is provided with an electron beam exit window 1b through which the electrons leave the emitter 1. The emitter 1 is further provided with a flange 1c by which it is fastened to the housing 2. The flange 1c surrounds the exit window 1b and also acts as a protection to the vulnerable exit window 1b. As shown in FIG. 2-5 the front surface of the exit window 1b is somewhat off set towards the body of the emitter 1 in relation to the front surface of the flange 1c.

The first element 10 is slidable in a first direction along a guide bar 11 mounted to the housing 2. The bar 11 extends generally transverse in relation to the running direction A of the web as it passes by the emitter(s) 1 in a plane parallel to the plane of the web as it passes by the emitter(s) 1. In the disclosed design the inner wall of the housing 2, the openings 2c, 2d in the housing 2, and the emitter window 1b all extend in parallel planes. These planes are chosen to be parallel to the web as it passes by the emitter(s) 1. As shown in the figures, the disclosed design comprises a guide bar 11 at the top of the emitter 1 and a guide bar 11 at the bottom of the emitter 1. On each guide bar 11 a first element 10 is slidably arranged. In a first embodiment the two first elements 10 are interconnected to move in parallel to each other, whereby they can be manoeuvred by a single motor or crank. In a second embodiment the two first elements 10 are separately slidable whereby an operator can e.g. at least partly tighten the bottom before the top is fastened.

Figure 2:
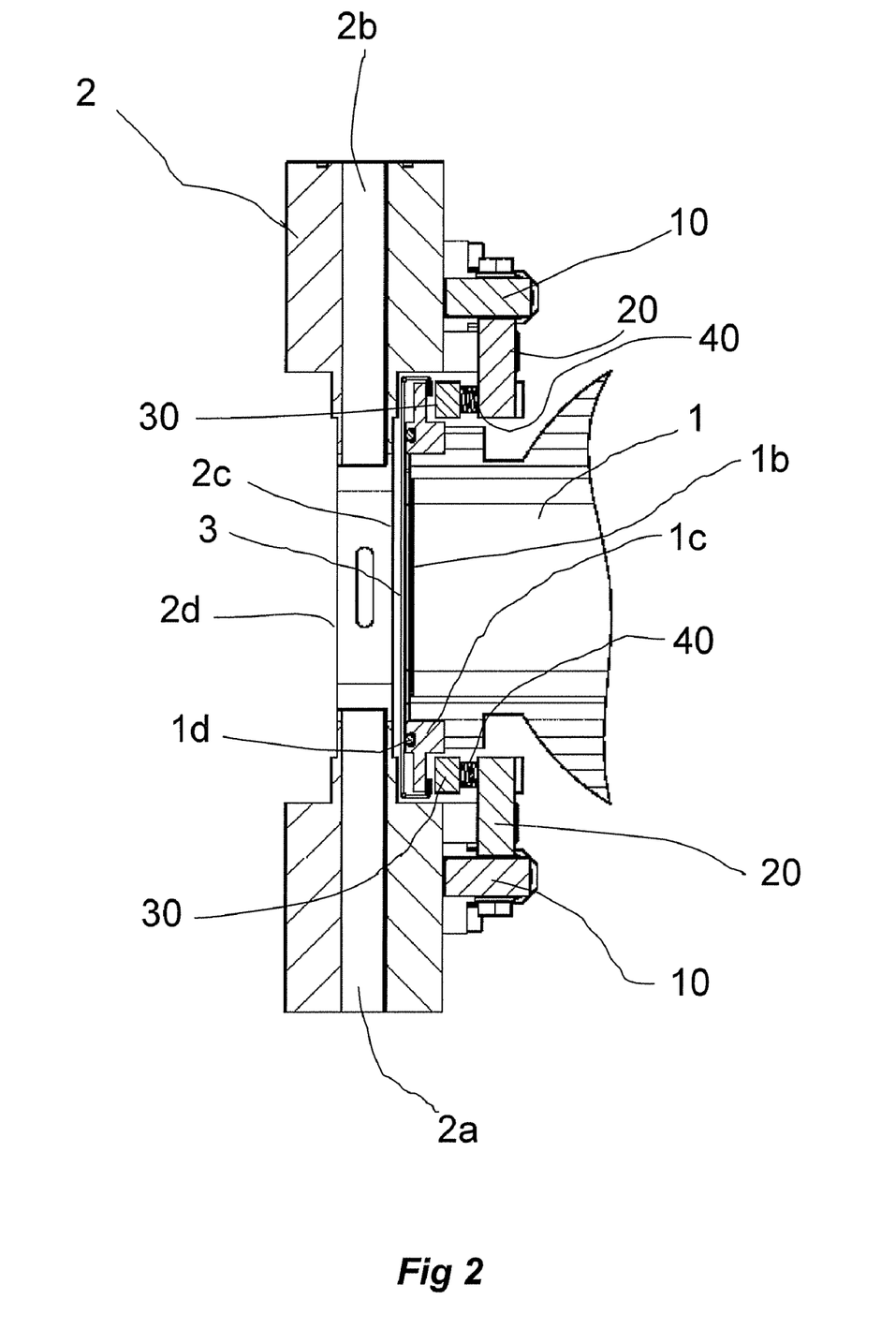
FIG. 2 is a cross-section showing the fastening device in an open position with an emitter positioned and still provided with a cover plate.

As shown in FIG. 2 the emitter 1 is provided with a cover plate 3 covering the vulnerable exit window 1b. The cover plate 3 can be slid on and off the flange 1c as the emitter 1 is positioned but not yet clamped to the housing 2. The second element 20 is slidable along guiding bars 21 in a second direction also named fastening direction. This second direction is perpendicular to the first direction. It is also perpendicular to the plane of the exit window 1b of the emitter. Moreover, in consequence with the above discussion about parallelism of the different planes, the second direction is also perpendicular to the opening in the housing 2c, 2d. The guiding bars 21 are also mounted to the housing 2. Furthermore, as in the case with the first element 10, the fastening device is provided with a second element 20 at the top of the emitter 1 and a second element 20 at the bottom of the emitter 1. Moreover, as in the case of the two first elements 10, the two second elements 20 can be interconnected to move in parallel or they can be adapted to move independently of each other. If the two first elements 10 are interconnected the two second elements 20 will consequently move at least substantially in parallel even if they are not connected to each other.

Figure 1:
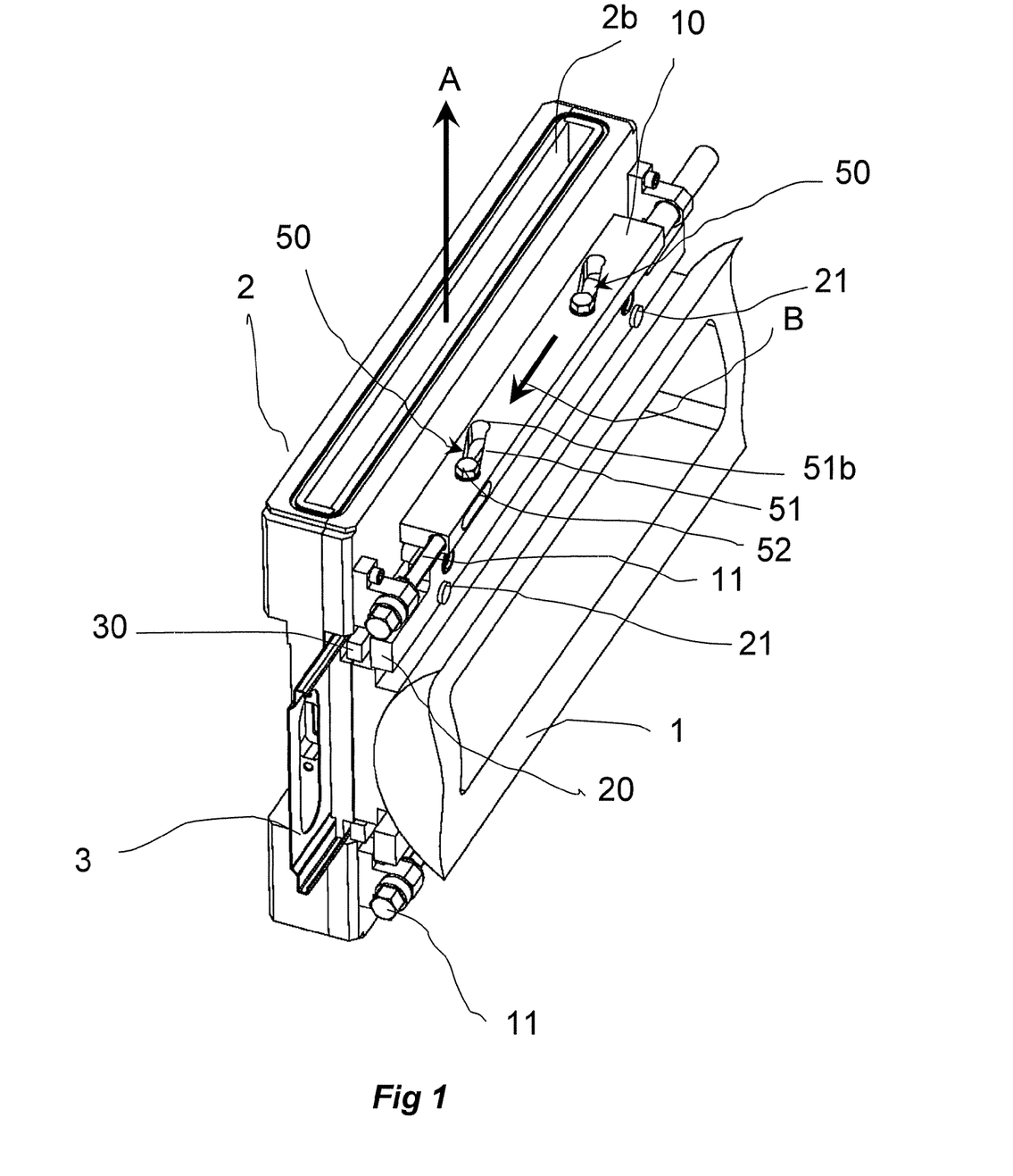
FIG. 1 is a perspective view of a fastening device.

The first element 10 and the second element 20 are interconnected via two cam mechanisms 50 such that displacement of the first element 10 in said first direction 11 causes displacement of the second element 20 in said second direction 21. Each cam mechanism 50 comprises an elongated, profiled slot 51 in the first element 10 and as a follower a pin 52 on the second element 20. As shown in FIG. 1, each combination of first and second elements 10, 20 are interconnected by two cam mechanisms 50.

When the first element 10 is moved in the direction marked with arrow B in FIG. 1 along guiding bar 11, the pins 52 of the second element will be forced towards the housing 2. The second elements 20 are not able to move in the same direction as the first element 10. The pins 52 are forced to remain within the recesses 51 of the first element 10 during the mutual movement between the first and second elements 10, 20. The recesses 51 are inclined in the plane defined by the guiding bars 11, 21 of the two interconnected elements 10, 20. The end portion 51b is formed along a straight line along the first element 10, i.e. it is straight along a line being perpendicular to the guiding bars 21 of the second element 20.

As mentioned above, the device further comprises a third, fastening element 30 being slidable in the second direction. The third element 30 is connected to the second element 20 via at least one spring forming a fourth, elastic element 40. In the disclosed design, the spring 40 is a conventional helical spring being able to be elastically compressed as the distance between the second and third elements 20, 30 is decreased.

Figure 3:
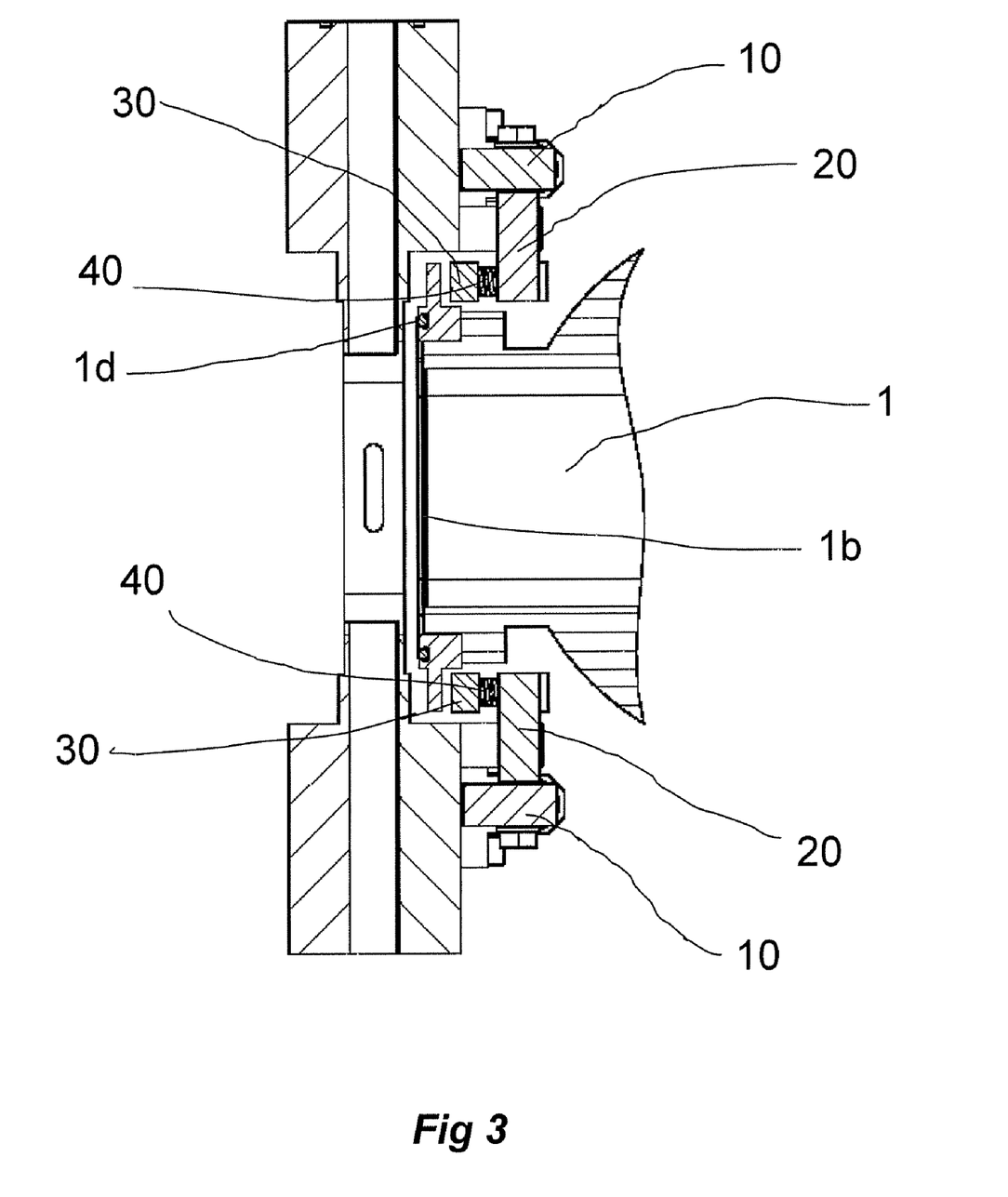
FIG. 3 is a cross-section showing the fastening device in the position as in FIG. 2 with the cover plate removed from the emitter.
Figure 4:
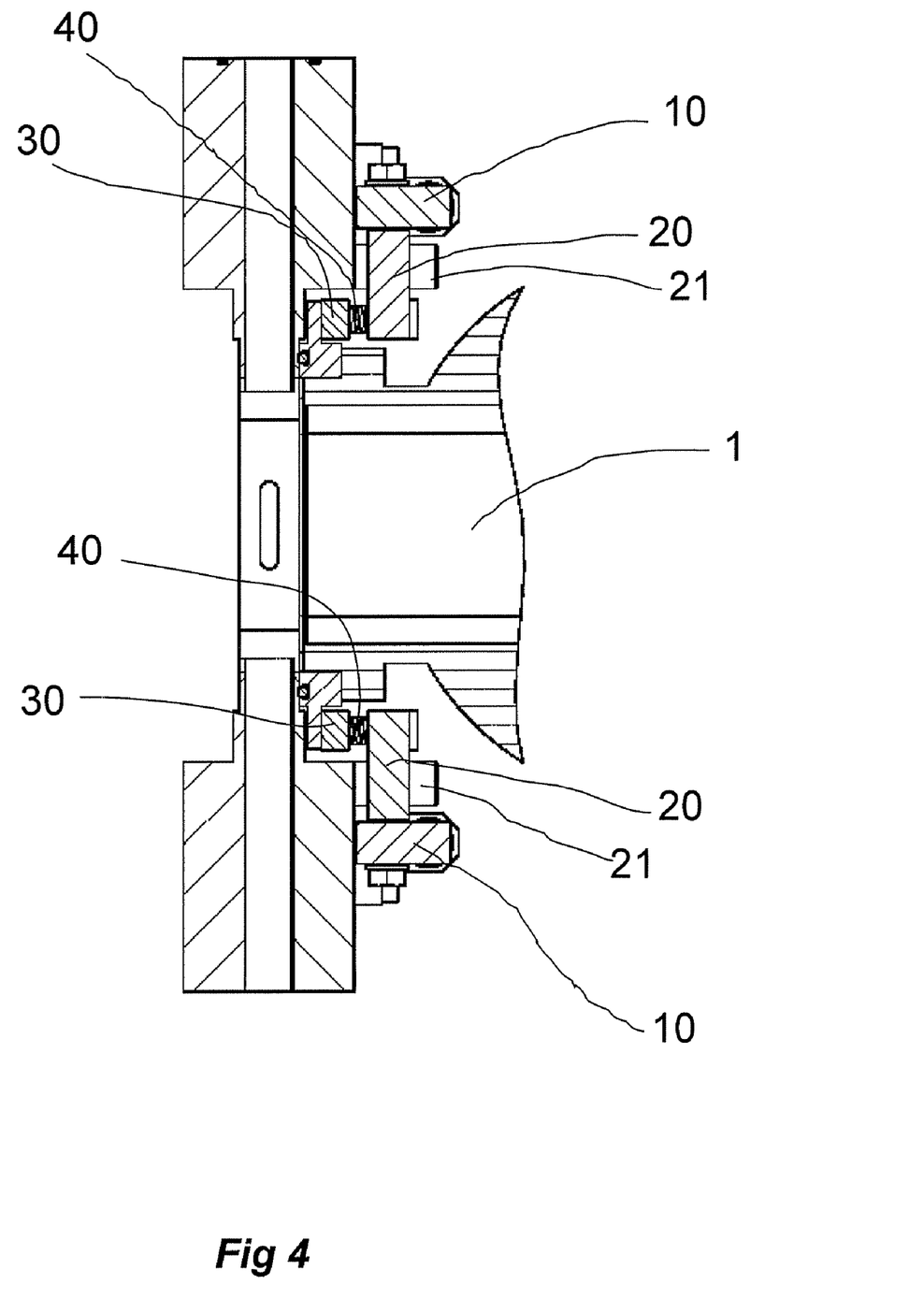
FIG. 4 is a cross-section showing the fastening device in a position in which the emitter is abutting the housing.

As shown in FIG. 2 the emitter is adapted to be placed such that it's flange 1c is placed between the edge around the opening 2c in the housing and the fastening element 30 of the fastening device. The cover plate 3 is then removed as shown in FIG. 3.

Thereafter, the manoeuvre element 10 is moved along arrow B in FIG. 1 a short distance corresponding about half way of the length of the recess 51. During this movement the emitter 1 is slid to abutment against the housing 2 by the force applied by the fastening element 30 onto the flange 1c from behind (see FIG. 4). The emitter 1 has a generally flat bottom portion and rolls on rolls or wheels mounted on a carrier mounted to the housing. This could of course also be a sliding motion in relation to some guide bars or the like mounted to the housing.

Figure 5:
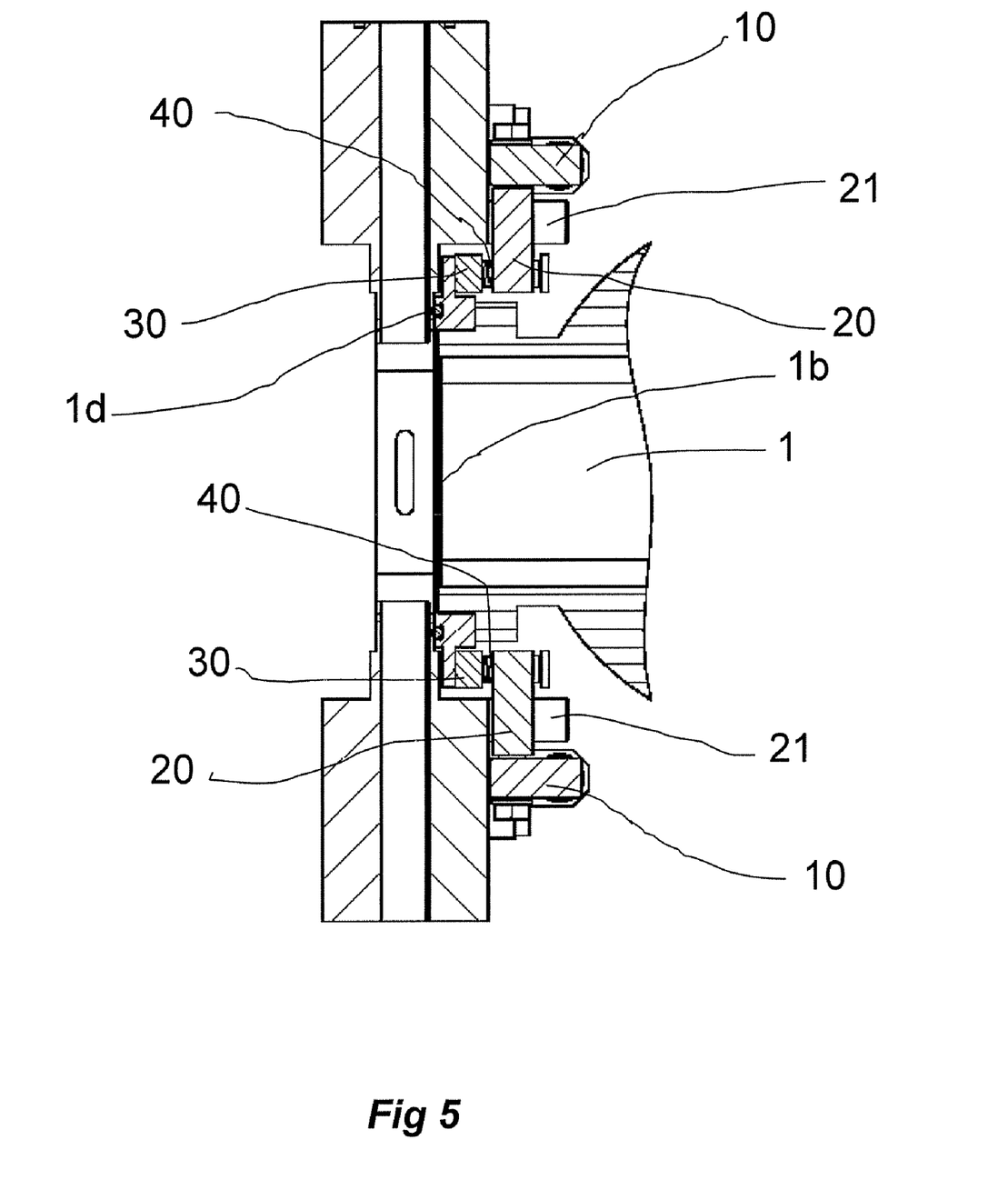
FIG. 5 is a cross-section showing the fastening device in a position in which the emitter is fastened to the housing.

When the manoeuvre element 10 is further moved along the first direction B, the activating element 20 is moved further against the housing 2 as shown in FIG. 5. This additional movement of the second element 20 after the emitter 1 has been slid into abutment to the housing 2 causes the springs 40 to be compressed the corresponding distance. Thus, the fastening force applied by the fastening element 30 onto the flange 1c of the emitter 1 is determined by the force from the springs 40 corresponding to the distance of deformation of the springs 40.

As shown in FIG. 2-5, the emitter 1 is also provided with a sealing 1d extending around the exit window 1b. The sealing is in the disclosed design a so-called O-ring seated in a recess in the flange 1c all around the exit window 1b. This sealing 1d secures a tight connection between the housing 2 and the flange 1c of the emitter 1.

It is contemplated that there are numerous modifications of the embodiments described herein, which are still within the scope of the invention as defined by the appended claims.

The spring might e.g. be biased by pre-compression using a stop mechanism or the like keeping the third element within a maximum distance from the second distance, this maximum distance being shorter than the nominal length of the spring when not being subjected to any force. This way the spring can be relatively weak, i.e. have a low spring coefficient and thus a low force/compression dependency and still produce a high fastening force. That is with a biased spring the fastening force can be set at a desired level almost independently of the stroke of the second element. It is also possible to use a spring having two or more portions with different spring coefficients e.g. giving rise to a initial fastening force being significantly lower than the final fastening force. This can e.g. be achieved with two serially interconnected springs with different spring coefficient, whereby the weakest spring first gives the initial fastening force and then collapses such that the stronger spring thereafter governs the fastening force. This can also be done more or less without any steps using a conical spring. A non-biased spring will automatically give rise to a continuously increasing fastening force as the spring is compressed. Of course an elastic rubber member or the like can also be employed. A rubber member is usually elastic in all directions and especially it is elastic in the fastening direction. It should also be noted that the cam mechanism can be designed e.g. with a roller running in the recess instead of the pin as disclosed. Moreover, is it contemplated that the surfaces of the pin and/or the recess can be provided with abutment surfaces with low friction such as by applying a surface coating or layers of plastic material such as Teflon or the like.

What is claimed is:

1. Device fastening an emitter to a housing;
   the emitter comprising a chamber containing an electrode source which produces electrons and a window through which the electrons are emitted;
   the device comprising:
   a fastening element slidable in a fastening direction;
   an activating element slidable in the fastening direction;
   the fastening and activating elements being interconnected via at least one elastic element that is elastic in the fastening direction;
   the fastening element being movable, in response to displacement of the activating element, between a fastening position in which the fastening element applies a fastening force to the emitter and an open position in which the fastening force is released; and
   a manoeuvre element slidable in a manoeuvre direction that is inclined in relation to the fastening direction, the manoeuvre element and the activating element being interconnected via at least one cam mechanism such that displacement of the manoeuvre element in the manoeuvre direction causes displacement of the activating element in the fastening direction, and the displacement of the activating element in the fastening direction causing movement of the fastening element in the fastening direction.

2. Device according to claim 1, wherein the cam mechanism comprises a profiled, elongated recess and a follower, the elongated recess being provided in one of the manoeuvre element and the activating element and forming a cam surface, the follower being provided on the other of the manoeuvre element and the activating element, the follower being positioned in and movable along the recess.

3. Device according claim 2, wherein the cam surface has an end portion oriented perpendicular to the fastening direction in which the activating element is slidable.

4. Device according to claim 1, wherein the cam mechanism comprises a profiled, elongated recess forming a cam surface in the manoeuvre element and a follower on the activating element, the follower being positioned in and movable along the recess.

5. Device according to claim 4, wherein the cam surface has an end portion oriented perpendicular to the fastening direction in which the activating element is slidable.

6. Device according to claim 5, wherein the elastic element has a minimal elastic length shorter than a distance between the activating element and the fastening element when the fastening element is the fastening position.

7. Device according to claim 6, wherein the at least one elastic element comprises at least two spaced apart elastic elements positioned between and interconnecting the activating element and the fastening element.

8. Device according to claim 1, wherein the elastic element has a minimal elastic length shorter than a distance between the activating element and the fastening element when the fastening element is the fastening position.

9. Device according to claim 1, wherein the at least one cam mechanism interconnecting the manoeuvre element and the activating element comprises at least two cam mechanisms interconnecting the manoeuvre element and the activating element.

10. Method of fastening an emitter to a housing comprising:
   positioning an emitter relative to a housing so that a portion of the emitter is located between the housing and a fastening device, the emitter comprising a chamber containing an electrode source that produces electrons and a window through which the electrons are emitted, the fastening device comprising a fastening element slidable in a fastening direction between a fastening position in which the fastening element applies a fastening force to the emitter and an open position in which the fastening force is released, a slidable activating element, and an elastic element interconnecting the fastening element and the activating element;

sliding the activating element in the fastening direction to slide the fastening element toward the fastening position and press the emitter towards the housing;

sliding the activating element to compress the elastic element so that the elastic element presses the fastening element against the emitter which in turn is pressed against the housing;

and sliding a manoeuvre element in a direction perpendicular to the fastening direction, with at least one cam mechanism interconnecting the activating element and the manoeuvre element as the manoeuvre element is slid in the direction perpendicular to the fastening direction to effect the sliding of the activating element in the fastening direction.

11. Method according to claim 10, wherein the activating element is slid in the fastening direction until it reaches an end position corresponding to the fastening position of the fastening element, and the elastic element only being partially compressed when the fastening element is at the fastening position.

12. Method according to claim 10, further comprising sliding a manoeuvre element in a direction perpendicular to the fastening direction to effect sliding of the activating element in the fastening direction.

13. Method according to claim 10, wherein the at least one cam mechanism comprises a pin extending from the activating element and positioned in a slot formed in the manoeuvre element, the slot comprising a cam surface engaged by the pin as the manoeuvre element is slid in the direction perpendicular to the fastening direction.

14. A device fastening an emitter to a housing;

the emitter comprising a chamber containing an electron source that produces electrons and a window through which the electrons are emitted, the device comprising,
a fastening element slidable in a fastening direction,
an activating element slidable in the fastening direction,
an elastic element interconnecting the fastening element and the activating element so that sliding movement of the activating element causes sliding movement of the fastening element,
the elastic element being elastically compressable in the fastening direction, the fastening element being slidable in response to sliding movement of the activating element between a fastening position in which the fastening element applies a fastening force to the emitter by which the emitter is urged towards the housing, and an open position in which the fastening force is released, and a manoeuvre element slidable in a manoeuvre direction that is inclined in relation to the fastening direction, the manoeuvre element and the activating element being interconnected via at least one cam mechanism such that displacement of the manoeuvre element in the manoeuvre direction causes displacement of the activating element in the fastening direction, and the displacement of the activating element in the fastening direction causing movement of the fastening element in the fastening direction.

15. A device fastening an emitter to a housing according to claim 14, wherein the cam mechanism comprises a profiled, elongated recess and a follower, the elongated recess being provided in one of the manoeuvre element and the activating element and forming a cam surface, the follower being provided on the other of the manoeuvre element and the activating element, the follower being positioned in and movable along the recess.

16. A device fastening an emitter to a housing according claim 15, wherein the cam surface has an end portion oriented perpendicular to the fastening direction in which the activating element is slidable.

17. A device fastening an emitter to a housing according to claim 14, wherein the elastic element has a minimal elastic length shorter than a distance between the activating element and the fastening element when the fastening element is the fastening position.

18. A device fastening an emitter to a housing according to claim 14, wherein the at least one elastic element comprises at least two spaced apart elastic elements positioned between and interconnecting the activating element and the fastening element.

* * * * *